(12) United States Patent
Lewis et al.

(10) Patent No.: US 7,362,892 B2
(45) Date of Patent: Apr. 22, 2008

(54) SELF-OPTIMIZING CLASSIFIER (75) Inventors: Lori K. Lewis, Owego, NY (US); Rosemary D. Paradis, Vestal, NY (US); Dennis A. Tillotson, Glen Aubrey, NY (US)

(73) Assignee: Lockheed Martin Corporation, Bethesda, MD (US)

( * ) Notice: Subject to any disclaimer, the term of this patent is extended or adjusted under 35 U.S.C. 154(b) by 954 days.

(21) Appl. No.: 10/612,808

(22) Filed: Jul. 2, 2003

(65) Prior Publication Data

US 2005/0100209 A1    May 12, 2005

(51) Int. Cl.
G06K 9/62    (2006.01)
G06F 7/00    (2006.01)

(52) U.S. Cl. .............. 382/159; 382/156; 382/224; 707/3

(58) Field of Classification Search ........ 382/155–161, 382/181, 224–228; 707/3–6
See application file for complete search history.

(56) References Cited

U.S. PATENT DOCUMENTS

| | | | |
|---|---|---|---|
| 4,376,932 A * | 3/1983 | Cassada ..................... 382/216 |
| 4,829,577 A * | 5/1989 | Kuroda et al. .............. 704/244 |
| 5,276,770 A | 1/1994 | Castelaz |
| 5,377,307 A | 12/1994 | Hoskins et al. |
| 5,473,730 A | 12/1995 | Simard |
| 5,479,572 A | 12/1995 | Marcantonio |
| 5,544,257 A * | 8/1996 | Bellegarda et al. ......... 382/187 |
| 5,561,741 A | 10/1996 | Wasserman |
| 5,600,758 A | 2/1997 | Broese et al. |
| 5,617,486 A * | 4/1997 | Chow et al. ................. 382/181 |
| 5,640,493 A | 6/1997 | Skeirik |
| 5,699,487 A | 12/1997 | Richardson |
| 5,720,002 A | 2/1998 | Wang |
| 5,796,863 A * | 8/1998 | Lyon .......................... 382/157 |
| 5,826,249 A | 10/1998 | Skeirik |
| 5,832,466 A | 11/1998 | Feldgajer |
| 5,835,901 A | 11/1998 | Duvoisin, III et al. |
| 5,877,954 A | 3/1999 | Klimasauskas et al. |
| 5,943,661 A | 8/1999 | Katz |
| 6,018,728 A | 1/2000 | Spence et al. |
| 6,038,556 A | 3/2000 | Hutchison |
| 6,049,793 A | 4/2000 | Tomita |
| 6,058,205 A * | 5/2000 | Bahl et al. .................. 382/159 |
| 6,154,559 A * | 11/2000 | Beardsley ................... 382/103 |
| 6,185,470 B1 | 2/2001 | Pado et al. |

(Continued)

OTHER PUBLICATIONS

"Modeling & Forecasting the Information Sciences", Brian R. Gaines, Knowledge Science Institute, University of Calgary.

(Continued)

Primary Examiner—Jingge Wu
Assistant Examiner—Manav Seth
(74) Attorney, Agent, or Firm—Tarolli, Sundheim, Covell & Tummino LLP (57) ABSTRACT A method and computer program product are disclosed for determining an optimal classifier model for a pattern recognition system and updating the determined model to recognize new output classes. An initial plurality of classifier models are selected from a set of generated classifier models. An optimal representative classifier for each classifier model is selected according to an iterative optimization routine. The representative classifier having the highest associated value for a fitness function is accepted.

11 Claims, 4 Drawing Sheets

U.S. PATENT DOCUMENTS

| | | |
|---|---|---|
| 6,249,781 B1 | 6/2001 | Sutton |
| 6,256,410 B1* | 7/2001 | Nathan et al. .............. 382/187 |
| 6,269,351 B1 | 7/2001 | Black |
| 6,272,479 B1 | 8/2001 | Farry et al. |
| 6,336,109 B2 | 1/2002 | Howard |
| 6,363,289 B1 | 3/2002 | Keeler et al. |
| 6,363,348 B1* | 3/2002 | Besling et al. ........... 704/270.1 |
| 6,823,306 B2* | 11/2004 | Reding et al. .............. 704/244 |
| 6,879,969 B2* | 4/2005 | Engstrom et al. ............. 706/20 |
| 7,113,636 B2* | 9/2006 | Ii et al. ..................... 382/159 |
| 7,181,438 B1* | 2/2007 | Szabo ........................... 707/2 |
| 2001/0025232 A1 | 9/2001 | Klimasauskas et al. |
| 2002/0016782 A1 | 2/2002 | Cooper |
| 2003/0063780 A1* | 4/2003 | Gutta et al. ................. 382/118 |
| 2004/0022441 A1* | 2/2004 | Cecala et al. ............... 382/225 |
| 2004/0032981 A1* | 2/2004 | Ii et al. ..................... 382/159 |
| 2004/0096100 A1* | 5/2004 | Ii et al. ..................... 382/159 |
| 2004/0096107 A1* | 5/2004 | Ii et al. ..................... 382/224 |

OTHER PUBLICATIONS

"An Overview of Neural Networks", Adaptivity.
"High-Speed Learning System for Large-Scale Optical Neural Network", Masahiko Mori, Yutaka Yagai, Toyohiko Yatagai.

* cited by examiner

SELF-OPTIMIZING CLASSIFIER

BACKGROUND OF THE INVENTION

1. Technical Field

The invention relates to a method and computer program product for producing an optimal classifier model for a pattern recognition system. Image processing systems often contain pattern recognition systems.

2. Description of the Prior Art

Pattern recognition systems, loosely defined, are systems capable of distinguishing between various classes of real world stimuli according to their divergent characteristics. A number of applications require pattern recognition systems, which allow a system to deal with unrefined data without significant human intervention. By way of example, a pattern recognition system may attempt to classify individual letters to reduce a handwritten document to electronic text. Alternatively, the system may classify spoken utterances to allow verbal commands to be received at a computer console.

A typical prior art classifier is trained over a plurality of output classes using a set of training samples. The training samples are processed, data relating to features of interest are extracted, and training parameters are derived from this feature data. As the system receives an input associated with one of a plurality of classes, it analyzes its relationship to each class via a classification technique based upon these training parameters. From this analysis, the system produces an output class and an associated confidence value.

Designing a pattern recognition classifier for a specific application is generally a hit or miss task. It often requires multiple iterations and a significant amount of time to develop a working system. Further, in some applications, new output classes frequently appear in the population of samples classified by the system. For these applications, it is necessary to regularly add new output classes to reflect changes in the data population. Without some method of identifying new classes, the system will not be able to deal with the novel patterns effectively. Once discovered, it will also be necessary to retrain the classifier to accept the new class. To maintain optimal system performance, it may be necessary to reconfigure the design of the classifier in light of the newly added output classes, requiring another lengthy training process.

SUMMARY OF THE INVENTION

To this end, according to one aspect of the invention, a method is presented for determining an optimal classifier model for a pattern recognition system. An initial plurality of classifier models are selected from a set of generated classifier models. An optimal representative classifier model is generated according to an iterative optimization routine. The representative classifier having the highest associated value for a fitness function is accepted.

In one embodiment of the invention, the iterative process can include a series of steps that are repeated until the occurrence of a termination event. For example, the termination event can be the satisfaction of a fitness function threshold. Within the iterative process of the example embodiment, any combination of one or more of the following steps may comprise a portion of the iterative loop of the process. An architecture can be determined for each selected classifier model according to an optimization algorithm. At least one numerical parameter can be optimized within a determined architecture. A set of optimum features can be determined for a determined architecture.

In accordance with another aspect of the invention, a method is described for automatically updating a pattern recognition classifier to recognize additional classes. A plurality of rejected pattern samples are grouped into clusters according to similarities among the pattern samples. At least one database is searched to identify at least one of the clusters of rejected pattern samples. If one or more clusters are not identified in the database search, at least one cluster not identified in the database search is submitted to an expert verifier for identification. The pattern samples from the identified clusters are then added to a set of training samples.

In accordance with yet another aspect of the invention, a computer program product is disclosed for determining an optimal classifier model for a pattern recognition system. A system control program selects a plurality of classifier models from a set of generated classifier models. An iterative loop produces an optimal representative classifier for each classifier model, according to an iterative optimization routine. The system control program accepts the representative classifier having a best associated value for a fitness function at the termination of the optimization routine.

In one embodiment of the computer program product, the iterative loop can comprise one or more of the following subroutines. The architecture determination portion can determine an architecture for each selected classifier model according to an optimization algorithm. A parameter optimizer can optimize at least one parameter within a determined architecture. A feature optimizer can select an optimal set of features for a determined architecture.

In accordance with another aspect of the invention, a computer program product is disclosed for updating a pattern recognition classifier to recognize new classes. A clustering portion groups a plurality of rejected pattern samples into clusters according to the similarities between the pattern samples. An artificially intelligent trained program searches at least one database to identify at least one of the clusters of rejected pattern samples. If one or more clusters are not identified in the database search, a controller program submits at least one cluster not identified in the database search to an expert verifier for identification. The controller program adds the pattern samples from the identified clusters to a set of training samples.

BRIEF DESCRIPTION OF THE DRAWINGS

The foregoing and other features of the present invention will become apparent to one skilled in the art to which the present invention relates upon consideration of the following description of the invention with reference to the accompanying drawings, wherein.

DETAILED DESCRIPTION OF THE INVENTION

In accordance with the present invention, a self-optimizing pattern recognition classification system that optimizes to a specific set of training samples is described. The classifier can be used in any traditional pattern recognition classifier task, including, for example, optical character recognition (OCR), speech translation, and image analysis in medical, military, and industrial applications.

It should be noted that the present invention, as one embodiment, can be implemented as a computer program. Therefore, the structures described herein can be considered to refer to individual modules and tasks within these programs. Portions of the present invention are intended to emulate the function of a neural network. Accordingly, understanding of the present invention will be facilitated by an understanding of the operation and structure of a neural network.

Figure 1:
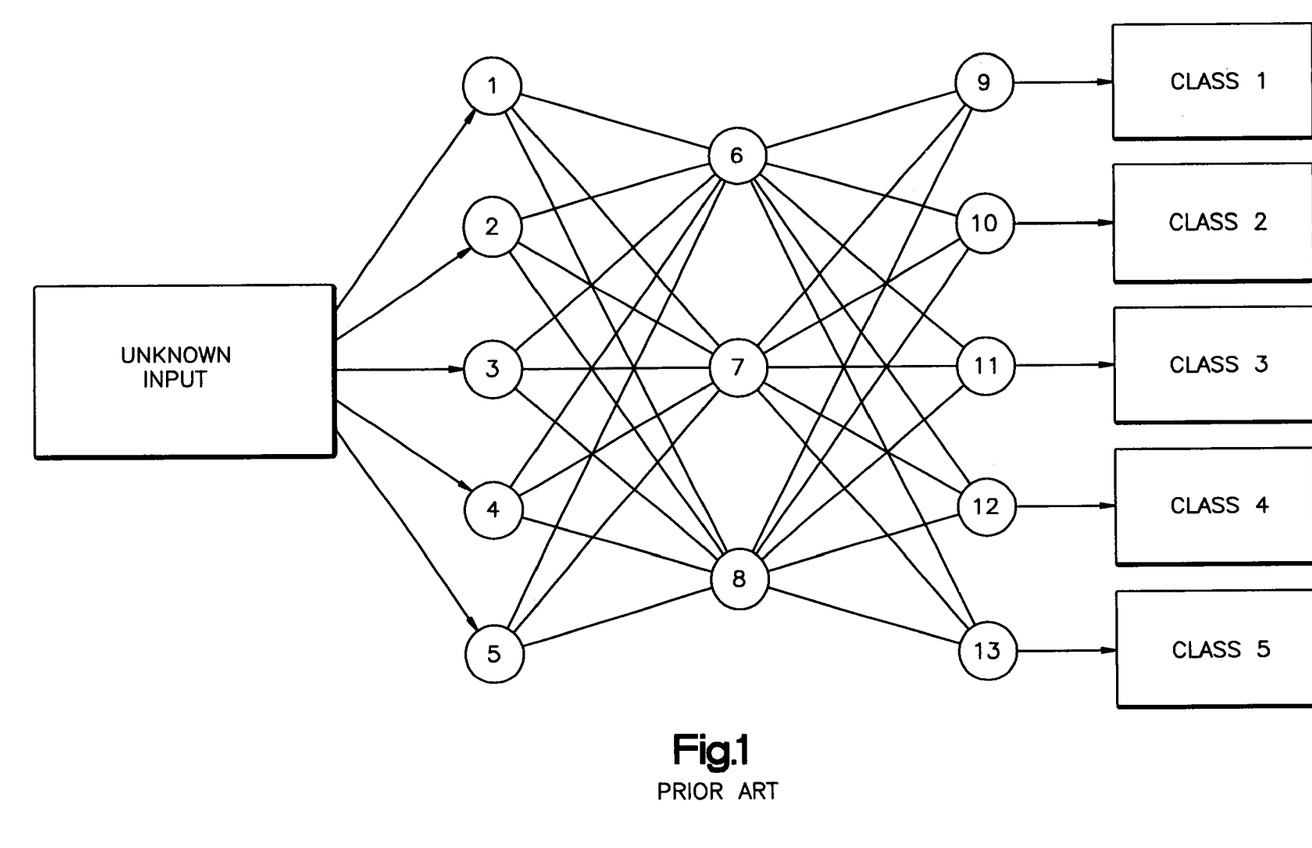
FIG. 1 is an illustration of an exemplary neural network utilized for pattern recognition.

FIG. 1 illustrates a neural network that might be used in a pattern recognition task. The illustrated neural network is a three-layer back-propagation neural network used in a pattern classification system. It should be noted here, that the neural network illustrated in FIG. 1 is a simple example solely for the purposes of illustration. Any non-trivial application involving a neural network, including pattern classification, would require a network with many more nodes in each layer. In addition, further hidden layers might be required.

In the illustrated example, an input layer comprises five input nodes, 1-5. A node, generally speaking, is a processing unit of a neural network. A node can receive multiple inputs from previous layers which it processes according to an internal formula. The output of this processing can be provided to multiple other nodes in subsequent layers. The functioning of nodes within a neural network is designed to mimic the function of neurons within a human brain.

Each of the five input nodes 1-5 receives input signals with values relating to features of an input pattern. The term "features" is here intended to encompass any quantifiable data useful for distinguishing among output classes that can be extracted from the pattern, including a bit by bit input of the pattern itself in either an original or a compressed form. By way of example, the signal values could relate to the portion of an image within a particular range of grayscale brightness. Alternatively, the signal values could relate to the average frequency of an audio signal over a particular segment of a recording. Preferably, a large number of input nodes will be used, receiving signal values derived from a variety of pattern features.

Each input node sends a signal to each of three intermediate nodes 6-8 in the hidden layer. The value represented by each signal will be based upon the value of the signal received at the input node. It will be appreciated, of course, that in practice, a classification neural network can have a number of hidden layers, depending on the nature of the classification task.

Each connection between nodes of different layers is characterized by an individual weight. These weights are established during the training of the neural network. The value of the signal provided to the hidden layer by the input nodes is derived by multiplying the value of the original input signal at the input node by the weight of the connection between the input node and the intermediate node. Thus, each intermediate node receives a signal from each of the input nodes, but due to the individualized weight of each connection, each intermediate node receives a signal of different value from each input node. For example, assume that the input signal at node 1 is of a value of 5 and the weight of the connection between node 1 and nodes 6-8 are 0.6, 0.2, and 0.4 respectively. The signals passed from node 1 to the intermediate nodes 6-8 will have values of 3, 1, and 2.

Each intermediate node 6-8 sums the weighted input signals it receives. This input sum can include a constant bias input at each node. The sum of the inputs is provided into a transfer function within the node to compute an output. A number of transfer functions can be used within a neural network of this type. By way of example, a threshold function can be used, where the node outputs a constant value when the summed inputs exceed a predetermined threshold. Alternatively, a linear, sigmoid or other appropriate function can be used, passing the value of the function evaluated at the input sum to the nodes of the next layer.

Regardless of the transfer function used, the intermediate nodes 6-8 pass a signal with the computed output value to each of the nodes 9-13 of the output layer. An individual intermediate node (i.e. 7) will send the same output signal to each of the output nodes 9-13, but like the input values described above, the output signal value will be weighted differently at each individual connection. The weighted output signals from the intermediate nodes are summed to produce an output signal. Again, this sum can include a constant bias input.

Each output node represents an output class of the classifier. The value of the output signal produced at each output node represents the probability that a given input sample belongs to the associated class. In the example system, the class with the highest associated probability is selected, so long as the probability exceeds a predetermined threshold value. The value represented by the output signal is retained as a confidence value of the classification.

Turning to the present invention, the self-organizing classifier can be considered as two parts, a training portion and a learning portion. The training portion creates and optimizes the classifier model through an optimization process. The learning portion represents the run-time operation of the classifier. The learning portion collects samples that the classifier model could not identify with a sufficiently high level of confidence and obtains class information for these samples. When samples representing new classes are discovered, these samples are added to the training set, and the classifier is retrained and optimized on the new samples.

Figure 2:
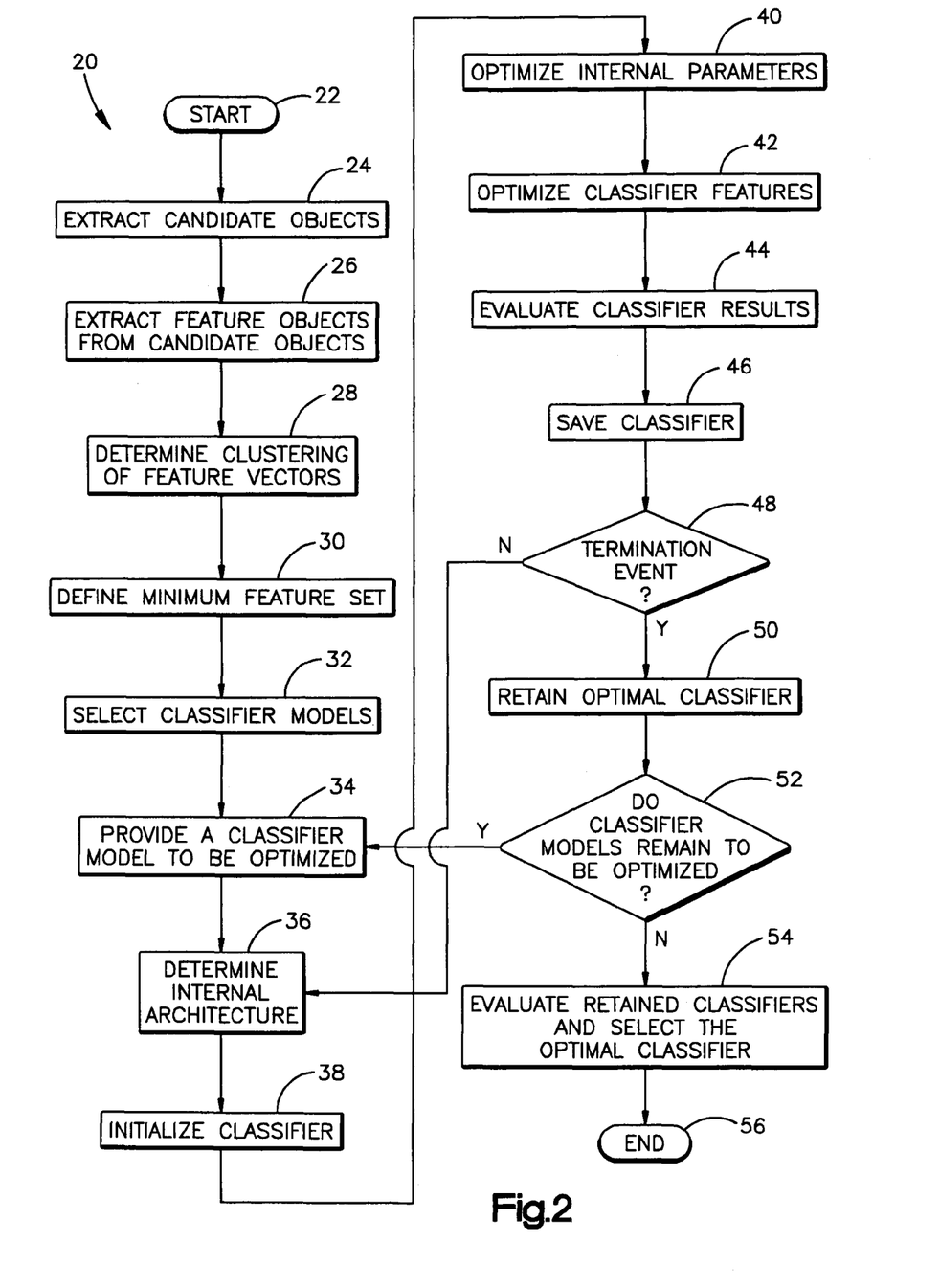
FIG. 2 is a flow diagram illustrating the operation of training portion of the self-optimizing classifier of the present invention.

FIG. 2 illustrates the operation of training portion of the self-optimizing classifier of the present invention. The process 20 begins at step 22. It then proceeds to step 24, where regions of interest, portions of a pattern that can contain recognizable data, are segmented from a plurality of pattern samples. These segmented regions of interest are referred to as candidate objects, and the segmentation of images into candidate objects is known in the art. The process then advances to step 26, where feature data is extracted from the candidate objects. Feature extraction converts the pattern into a vector of numerical measurements, referred to as feature variables. Thus, the feature vector represents the input data in a compact form. Many feature types exist and are selected based on the characteristics of the recognition problem.

After the feature vectors are extracted from the candidate objects, the process continues to step 28. At step 28, the extracted feature vectors are clustered to determine appropriate output classes. In an example embodiment, the pattern segments are input into a self-organizing map to determine a natural clustering of the training vectors. A class designation for the clustered pattern segments is assigned according to the cluster in which the segment is located. In an alternate embodiment, the output classes and the associated class of each of the clustered segments can be predetermined by a human operator.

The process then advances to step 30. At step 30, a set of minimum features is defined for the classification analysis. The minimum feature set includes those features necessary to define an n-dimensional feature space in which all of the output classes are distinct and well separated. The extracted feature data is subjected to a factorial or component analysis to determine the contribution of each factor to providing separation between the defined output classes. This can include various types of factorial analysis of variance, principle component analysis, and similar statistical techniques.

The process then proceeds to step 32, where a plurality of classifier models are selected. These classifier models can be preselected by an operator or selected by the system according to rule-based logic encoded in a configuration file. The term classifier model is intended to refer to the abstract framework of a classifier system, as opposed to the internal architecture or specific parameters of the classifier. The classifier models can include both neural network models such as the back propagation neural network, one of its variants (e.g., QuickProp), auto-associative networks, self-organizing maps, or various radial basis function networks, as well as non-neural network models, such as boosting and bagging classifiers and support vector machines.

For each classifier model selected, an iterative optimization process takes place to produce an optimal classifier for the given training set. The optimization process can be performed in parallel or in series for the selected classifier models, depending on the system resources available.

The optimization process begins at step 34, where one of the selected classifier models is provided to the optimization loop. At step 36, the internal architecture of a classifier based on the provided model is altered according to an optimization algorithm. At this step, the internal structure and mechanics of the network can be changed in an attempt to produce a more efficient classifier system. For example, in a neural network classifier, these changes can include adding or removing nodes, layers, or interlayer connections. In a self-organizing map, the number of map units can be changed as well as the radius of the learning neighborhood.

The process proceeds to step 38, where the classifier represented by the determined architecture is initialized. Through initialization, the classifier is set to an initial state to facilitate later training and optimization. In a neural network classifier, for example, the weights of the classifier are set to an initial value, usually a random value.

At step 40, the internal parameters of the classifier represented by the determined architecture are optimized. At this step, the necessary internal parameters, such as weights, kernels, or statistical class parameters, are calculated as to maximize the ability of the classifier to distinguish between the output classes. This can be done via a number of methods, including genetic algorithms, gradient-based searching, and simulated annealing techniques. A cost function based on the complexity and accuracy of the system can be used as a metric for this optimization. The technique used for optimization will depend strongly on the classifier model used. For example, some classifier models, such as back-propagation neural networks, implicitly include an optimization method. These models can be used in combination with a second optimization method to improve the accuracy and efficiency of classification.

After the classifier parameters are optimized, the process proceeds to step 42, where an optimal feature set for the classifier represented by the determined architecture is selected. An optimization algorithm is used to select the features that minimize a cost function, based on the processing time necessary to implement the feature and the accuracy obtained with the feature. Useful optimization techniques include genetic algorithms, discrete gradient searches, and similar techniques.

After the features are selected, the process continues to step 44, where the performance of the classifier architecture is evaluated. In evaluating the architecture, a test set of pattern samples with known class associations is submitted to the classifier. The classification results are compared to the known associations to determine the accuracy of the classifier represented by the architecture. A fitness function is calculated based upon the complexity of the system and the accuracy and completeness of the classifier's classification of the test set. The fitness function will vary depending on the classifier model selected and the intended application of the classifier.

The system then proceeds to step 46. At step 46, the internal architecture, optimal parameters, and optimal features are saved to memory along with the results of the evaluation. To preserve memory, only architectures meeting certain fitness criteria can be saved in the memory. For example, the memory may store only a predetermined number of the fittest architectures, requiring a newly generated architecture to surpass the fitness of the existing architectures to be stored in memory.

The process then proceeds to step 48, where the system checks for a termination event. Examples include the fitness function meeting a threshold value, an elapsed period of time, or an elapsed number of iterations. If no termination event has occurred, the process returns to step 34 to generate new classification structures for comparison. If a termination event has occurred, the classifier represented by the architecture with the best fitness value is retained as a representative classifier at step 50.

At step 52, the system determines if any of the selected classifier models remain to be optimized. If so, the process returns to step 34, where one of the remaining classifier models is provided for optimization. After all of the classifier models have been optimized, the process advances to step 54, where the representative classifier for each model is evaluated according to a second fitness function. This fitness function will be a function of the complexity of the classifier and the accuracy and completeness of its classification of the test set at step 44. The specifics of the fitness function will vary with the application. Once the fitness of each classifier has been calculated, the classifier producing the best fitness value is selected. The process then terminates at step 56.

Figure 3:
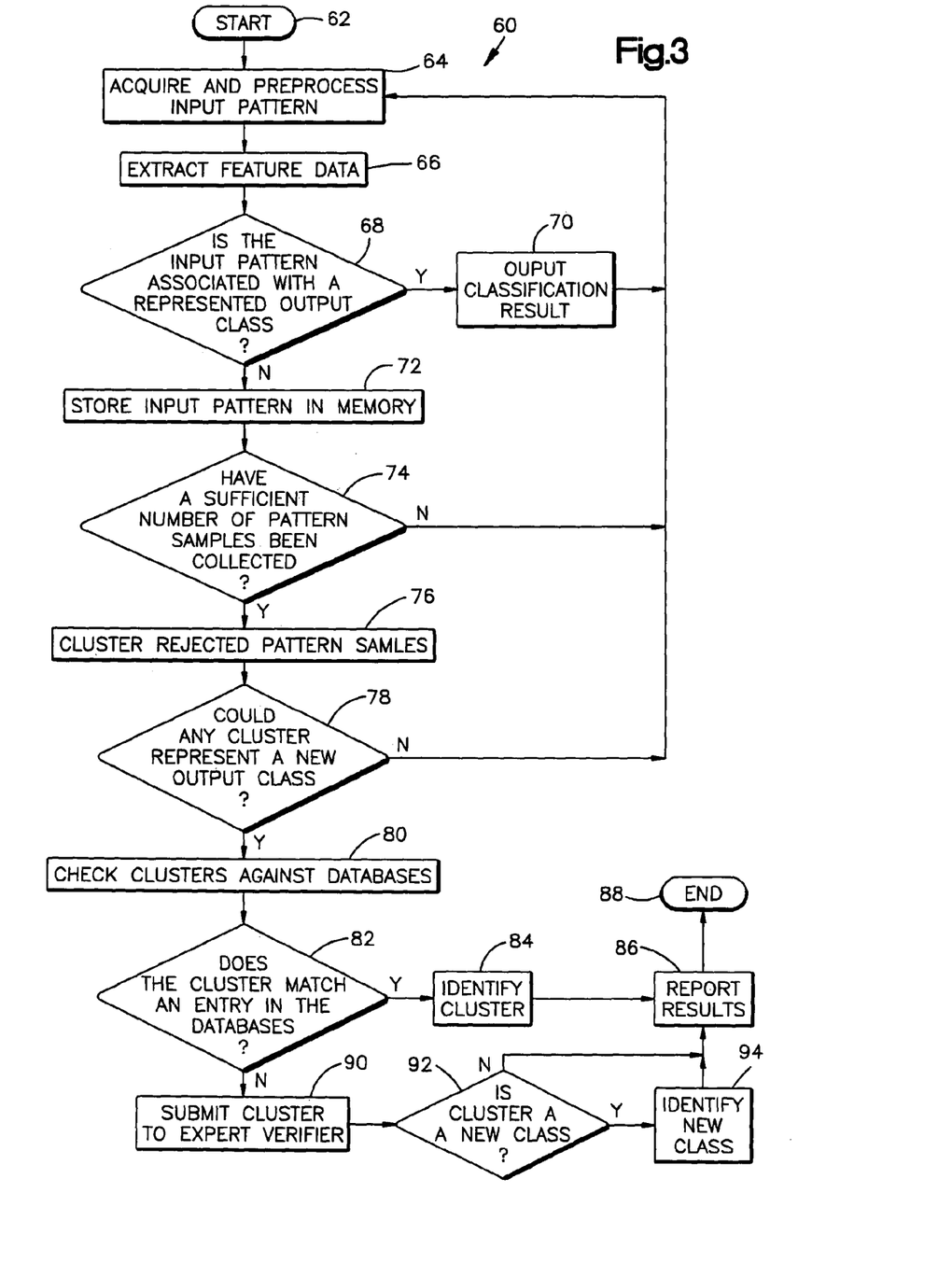
FIG. 3 is a flow diagram illustrating the run-time operation of the self-optimizing classifier.

FIG. 3 illustrates the run-time operation of the self-optimizing classifier of the present invention. The process 60 begins at step 62 and proceeds to step 64, where an input pattern is acquired and preprocessed. During preprocessing, the pattern is enhanced, portions of interest are located, and obvious noise is eliminated. The process then proceeds to step 66, where feature data is extracted from the pattern in the form of feature vectors. The feature extraction process of the learning portion is similar to that described above and will not be described further here.

The process then advances to step 68, where the system determines if the input pattern is associated with an output class represented by the system. The specifics of this determination will vary depending on the classifier produced during the training stage. If the system determines that the input pattern is associated with a represented output class, the process proceeds to step 70, where the system outputs the classification result and returns to step 64 to process another input pattern.

If the input pattern is rejected (i.e. not determined to be associated with a particular class), the process advances to step 72, where the pattern is stored in memory. The process then advances to step 74, where the system determines if a sufficient number of samples have been collected to conduct a clustering analysis. If an insufficient number of samples have been collected, the system returns to step 64 to process another pattern.

If a sufficient number of pattern samples have been collected, the learning process begins. At step 76, the collected patterns are grouped into clusters according to their proximity in feature space. In other words, patterns possessing similar features are grouped together, according to a clustering algorithm. A number of clustering algorithms exist for use in this application, including k-means algorithms, gradient search techniques, and self-organizing maps.

The process then advances to step 78, where the system determines if any of the clusters could represent a new class. The criteria for this determination will vary, but it will generally focus on the density of the cluster. If a large number of pattern samples are gathered within a relatively small cluster, the cluster likely represents a class. The exact density necessary to represent a class will be determined by experimentation with a particular application. If no sufficiently dense cluster is found, the learning process terminates, and the classifier continues its run-time operation at step 64.

If any clusters are sufficiently dense to represent a new class, the process proceeds to step 80, where the clusters are checked against a database containing information about possible output classes by an artificially intelligent trained search program, or BOT. This can be accomplished by a number of methods including classification techniques, distance comparisons, or clustering algorithms. It should be noted that the database of possible classes need not be a single database. The BOT is capable of obtaining data even from unprepared sources, such as preselected Internet web pages pertaining to the subject of interest. Appropriate samples can be identified via a rough classifier that detects patterns of an appropriate type or through heuristic rules that identify samples that are likely to be of interest for a particular application.

For example, for a face recognition application, the BOT could search the FBI website to determine if the unmatched face belongs to a wanted criminal. In an alternate embodiment, the BOT could also conduct a general Internet search to locate possible samples. Generally, due to verification issues with online content, an Internet search would be useful mainly for finding an official or pre-verified site that has changed its Uniform Resource Identifier (URI). These sites can be verified by the similarity of content between the original page and the retrieved page. Where a specific resource is sought, however, it is possible to conduct a general Internet search on preselected application specific terms to find samples fitting a narrow range of characteristics. In such a case, either a verification routine or an expert verifier will be necessary to ensure that the retrieved samples are valid.

At step 82, it is determined if any class samples within the databases match the calculated cluster mean vectors. If class information is found in the databases, the process proceeds to step 84, where the cluster is identified as belonging to the located class and the pattern samples therein are added to a set of training vectors. The results are reported at step 86 and the learning process is terminated at step 88. The system then returns to the training process, where the classifier can be retrained on the newly classified samples.

If the cluster does not match a known class, the process advances to step 90, where the clusters are subjected to an expert verifier to identify new pattern classes. The expert verifier can take a number of forms. In one embodiment, the clustered pattern data is outputted to a human operator for review. Alternatively, the clustering can be verified by a computerized process, such as a modified clustering algorithm or a specialized classifier.

The process then proceeds to step 92, where the expert verifier determines if the cluster represents a new output class for the classifier. If not, the process advances to step 86 where the results are reported and then terminates at step 88. If so, the process continues at step 94, where the new class is identified by the expert verifier, and its information is added to the database. The process then continues to step 86 where the result is reported, and the learning process terminates at step 88. The system then reverts to the training stage to train the classifier to recognize the new class.

Figure 4:
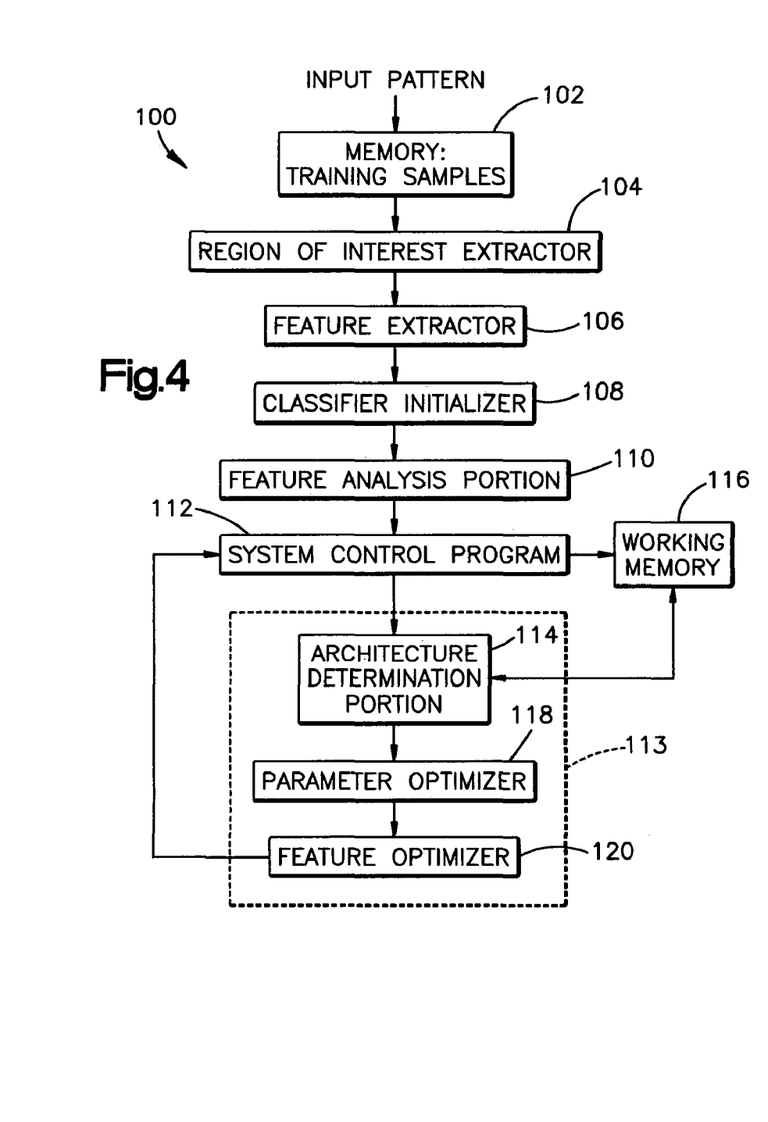
FIG. 4 is a functional block diagram of an example embodiment of the training portion of the self-optimizing classifier.

FIG. 4 is a functional diagram of an example embodiment of the training portion of the self-optimizing classifier of the present invention implemented as computer software within a data processing system. In the example embodiment, the input patterns are images of envelopes and the objects to be classified are postal indicia.

The training portion 100 includes a memory 102 containing a plurality of envelope image samples. A region of interest extractor 104 segments detected postal indicia within the envelope images. At this stage, portions of the envelope image that may contain a stamp or other significant marking are removed from the image and saved as separate images. Such image segmentation is well known in the art.

The segmented images are then passed to a feature extractor 106. The feature extractor 106 analyzes preselected features of the pattern. The selected features can be literally any values derived from the pattern that vary sufficiently among the various output classes to serve as a basis for discriminating among them. Numerical data extracted from the features can be conceived for computational purposes as a feature vector, with each element of the vector representing a variable value for one feature within the pattern. A large number of feature variables will be available; many divided into groups of related features known as feature groups. In the example embodiment, two examples of feature variable groups include a histogram feature variable group, and a compressed image feature variable group.

A scanned grayscale image consists of a number of individual pixels, each possessing an individual level of brightness, or grayscale value. The histogram feature variables focus on the grayscale value of the individual pixels within the image. Each of the histogram feature variables represents a range of grayscale values. The values for the histogram feature variables are derived from a count of the number of pixels within the image having a grayscale value within each range. By way of example, the first histogram feature variable might represent the number of pixels falling within the lightest sixteenth of the range of all possible grayscale values.

The compressed image variables represent the average grayscale values of the pixels within a number of preselected areas of the image. By way of example, these areas can be defined by a number of equally spaced grids superimposed across the image. Thus, the first variable could represent the average or summed value of the pixels within the upper left region of the grid.

The extracted feature variables are input into a classifier initializer 108. The classifier initializer clusters the inputted feature vectors to determine both the output classes of the system and the class associated with each of the input patterns. In the example embodiment, this clustering is accomplished by a self-organizing map.

The self-organizing algorithm begins with a distance determination among all of the feature vectors in the training set. A map is then formed with a number of discrete units. Associated with each unit is a weight vector, initially consisting of random values. Each of the feature vectors is inputted into the self-organizing map as a training vector. Units respond to the input vector according to the correlation between the input vector and the unit's weight vector. The unit with the highest response to the input is allowed to learn by changing its weight vector in accordance with the input, as are some other units in the neighborhood of the responding unit. The neighborhood can decrease in size during the training period.

The result of the training is that a pattern of organization emerges among the units. Different units learn to respond to different vectors in the input set, and units closer together will tend to respond to input vectors that resemble each other. When the training is finished, the set of feature vectors is applied to the map once more, marking for each class the unit that responds the strongest (i.e., is most similar) to that input vector. Thus, each class becomes associated with a particular unit on the map, creating natural clusters.

These natural clusters can be further grouped by combining map units that represent similar output classes. In the example embodiment, this clustering is accomplished by a genetic clustering algorithm. Once the self-organizing map clustering is established, it can be altered slightly by combining or separating map units. For each clustering state, a fitness metric is calculated to determine the utility of the clustering. This allows the system to select which clustering state is optimal for the selected application. In the example embodiment, the fitness metric is a function of the within groups variance of the clusters. One example includes the Fisher Discriminant Ratio, but similar metrics are well known in the art.

Once the output classes are established and the feature vectors are grouped into classes, a feature analysis portion 110 determines a minimum feature set for the classification analysis. In the example embodiment, this is accomplished through a principle component analysis. The principle component analysis provides a determination of how much of the variance between classes can be accounted for by each feature. A minimum feature set will include those features necessary to account for a predetermined level of variance.

After a minimum feature set is established, a system control program 112 begins an optimization process to determine the optimal classifier for the application. The system control program 112 selects a plurality of classifier models from a set of available models. In the example embodiment, available models include support vector machines, radial basis function networks, auto-associative networks, and self-organizing maps. Each classifier model is then subjected to an optimization process to select an optimal architecture for that model. Thus, an iterative loop 113 including an architecture determination portion 114, a parameter optimizer 118, and a feature optimizer 120 will produce an optimal classifier configuration for each selected classifier model. Accordingly, while the description of these components may speak in terms of optimizing a single classifier, the iterative process takes place multiple times to optimize a classifier corresponding to each classifier model. In the example embodiment, this is a serial process, with the classifiers being optimized in a sequence determined by the system control program 112.

The optimization process begins at an architecture determination portion 114. The architecture determination portion 114 determines a classifier architecture for each classifier model according to an optimization algorithm. The architecture determination portion 114 generates new classifier architectures by altering the structure and mechanics of existing classifier architectures. For the first trip through the optimization loop 113, a default classification architecture is used.

In the example embodiment, the optimization algorithm is a genetic algorithm. Thus, a predetermined number of default architectures are provided for evaluation within each model. As a general rule, at least one of the default classifier architectures for each model will define a maximum degree of complexity. The optimization loop 113 is conducted once for each of these architectures, ten in the example embodiment, and the generated classifiers are stored in a working memory 116.

Once the predetermined number of classifiers are stored, the architecture determination portion 114 will generate new classifier architectures based upon the architectures in the working memory 116. In the example embodiment, this is accomplished according to several genetic algorithm strategies. One is crossover, where features of one architecture are merged with those of a second architecture. For example, the structure of the hidden layers in a neural network classifier might remain the same, but some of the connections between the hidden layers can be changed to match a second classifier within the working memory. Another genetic algorithm strategy is mutation. Here, a random change is introduced to the structure of an individual classifier architecture. For example, in a neural network classifier, the number of nodes in a hidden layer can be expanded by a random number. These genetic algorithm strategies can be modified according to a set of heuristic rules, depending on the application. For example, where a series of classifiers having similar architectures are unpromising (i.e. having a classification accuracy below a threshold value), more radical changes can be made to the architecture, effectively ending the unpromising series. The heuristics serve to eliminate some of the randomness in the genetic algorithm and thus streamline the process.

The classifier architecture is initialized with initial values appropriate to its structure and passed to a parameter optimizer 118. At the parameter optimizer, the parameters of the classifier represented by the determined architecture are optimized to classify a set of sample images. The means of this optimization will vary with the classifier model.

The classifier architecture is then provided to a feature optimizer 120. Using the minimum feature set from the feature analyzer 110 as a starting point, the feature optimizer determines an optimal set of features for the classifier represented by the determined architecture. In the example embodiment, a genetic algorithm is used for this optimization as well. As with the overall classification loop, the process will begin with a predetermined number of example feature sets. These sets will be altered by crossover, mutation or other strategies until a termination event occurs. At this point, the feature set optimizing a cost function will be selected. In the example embodiment, the cost function will be a function of the accuracy of the classifier, measured as the number of misclassified and unclassified test samples, and the processing time necessary to incorporate the feature set.

After the feature set is optimized, the generated architecture is evaluated at the system control program 112. The system control program 112 calculates a fitness value for the classifier represented by the generated architecture based upon its performance and efficiency in classifying a test set of samples and calculating the generated error. The system control program 112 then compares this calculated fitness value to the fitness values of the architectures stored in the working memory 116. If the new classifier architecture is more fit (i.e. has a fitness value indicating superior efficiency, less error and more accuracy) than the least fit of the existing architectures, it replaces that least fit architecture in the working memory 116. In the example embodiment, the fitness function is a linear combination of variables representing the size of the classifier, the number of test samples that were not classified, the calculated error and the number of test samples that were misclassified. The coefficients modifying each of these variables will change according to the application and the specific classifier model being optimized.

The system control program 112 then determines if a termination event has occurred. In the example embodiment, the iterative optimization is terminated when the fitness function meets a threshold value or after a predetermined period of time. If no termination event has occurred, the process continues to a new iteration. Upon occurrence of a termination event, the program retains the classifier represented by the architecture with the lowest associated value of the fitness function. This classifier is saved to memory as a representative classifier for its associated classifier model.

The system control software 112 calculates a fitness function for the representative classifiers for each model. This fitness function is a function of the complexity of the classifier architecture and the accuracy and completeness of the classification of the test set during optimization. A confusion matrix, or a grid of the classification rates for each output category, is also generated to better determine the classification properties of the classifier at each output class. The representative classifier having the best overall value for this fitness function is selected as the optimal classifier and implemented.

Figure 5:
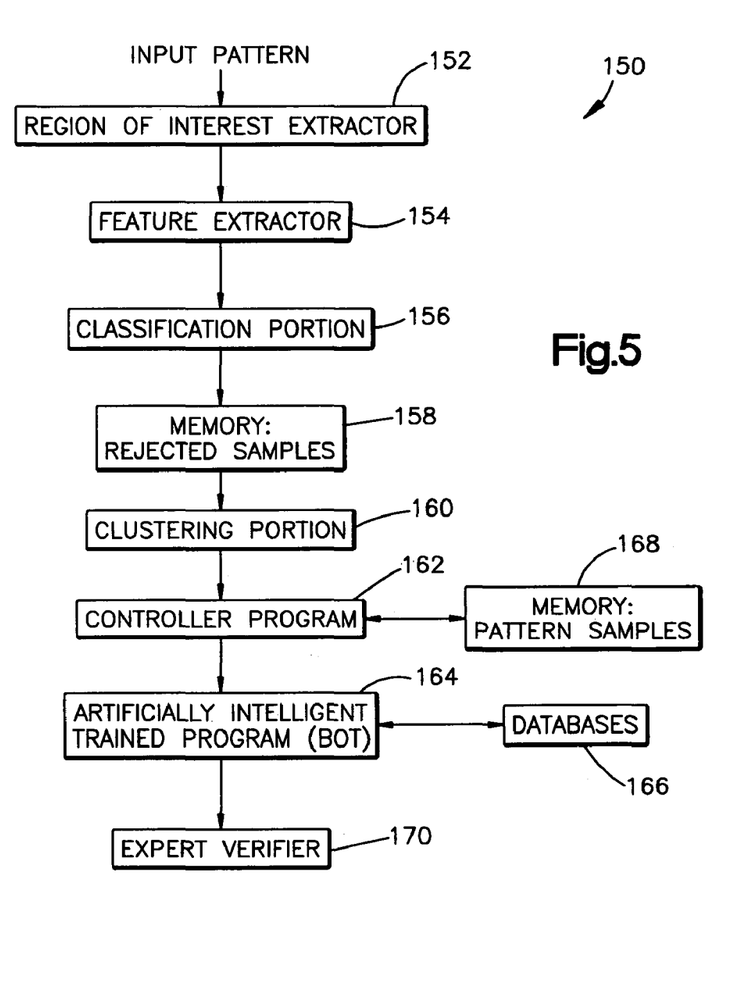
FIG. 5 is a functional block diagram of an example embodiment of the learning portion of the self-optimizing classifier.

FIG. 5 is a functional diagram of an example embodiment of the learning portion of the self-optimizing classifier of the present invention implemented as computer software within a data processing system. As with the previous diagram, the input patterns are images of envelopes and the objects to be classified are postal indicia.

The classifier 150 receives input images at a region of interest extractor 152. The extracted images are sent to a feature extractor 154, where a feature vector is extracted containing the features selected for the classifier in the training portion 100. The extracted feature vector is sent to the classification portion 156, which implements the optimized classifier developed in the training portion 100.

The classification portion 156 attempts to match the input feature vector to one of a plurality of represented output classes using the selected classification technique. In this process, a class will be selected, and a corresponding confidence measurement will be calculated. If the confidence measurement is above a predetermined threshold, the feature vector is classified as the corresponding class. If the confidence measurement does not exceed the threshold, the feature vectors are stored in a memory 158 for later analysis.

Once a sufficient number of image samples have been accumulated, the image samples are passed to a clustering portion 160. The clustering portion 160 groups the image samples into clusters based upon similarities in their features. More precisely, the clustering portion 160 groups together those images whose feature vectors are relatively close to one another within an N-dimensional space, where each of the N dimensions represents a feature variable. In the example embodiment, the clustering is performed by a self-organizing map, which operates similarly to the self-organizing map described for the training portion 100.

The new clusters are sent to a controller program 162, which determines if any of the new clusters could represent a new output class. If a large number of pattern samples are gathered within a relatively small cluster, the cluster likely represents a class. The exact density necessary to represent a class will be determined by experimentation with a particular application.

If any clusters are sufficiently dense to represent a new class, the clusters are passed to an artificially intelligent trained program, referred to hereinafter as a BOT 164. The BOT 164 checks the characteristics of the clusters against at least one database containing information about possible output classes. In the example embodiment of a postal indicia recognition system, the BOT 164 searches one or more databases 166 maintained internally by the classification system, references an external database (not shown), connected via an Ethernet connection and maintained externally, and searches an Internet website to obtain new stamp images.

In the example embodiment, cluster characteristics are calculated by averaging the feature vectors representing the points forming a cluster across the elements of the feature vectors to form a vector representative of the cluster, a cluster mean vector. Each cluster mean vector is compared to vectors derived from the information provided by the databases. These vectors may already exist in the databases, or they can be derived from a sample from the databases by a feature extraction process similar to that described above. These vectors serve as representatives of classes within the databases. Alternatively, feature vectors representing classes from databases can be entered into the self-organizing map of the clustering portion 160 to be matched with particular clusters.

The controller program 162 determines if any of the representative vectors within the databases match the calculated cluster mean vectors. In the example embodiment, a distance is calculated between the cluster mean vector and each of the representative vectors in the database. The distance calculation can be modified by the number of elements in the vectors or the number of vectors in the cluster in accordance with known statistical theory. The smallest computed distance is then compared with a threshold value. If the distance falls under the threshold value, then the cluster can be matched with the class represented by this closest vector.

When a match is found, the controller program 162 associates the pattern with the new class and directs the BOT 164 to record the class information in the internal database. The pattern samples forming the cluster are saved to a memory 168 to be used in later retraining and optimization of the classifier model by the training portion 100.

If no match is found in the databases, the clusters are sent to an expert verifier 170 to determine if the clustered pattern samples are indicative of a new class. In the example embodiment, the expert verifier 170 is a human operator. The expert verifier 170 identifies the clusters and directs the BOT 164 to input the results to the internal database 166. If a cluster is determined to be a class, the pattern samples forming the cluster are saved to the memory 168 to be used in retraining and optimization of the classifier model by the training portion 100.

It will be understood that the above description of the present invention is susceptible to various modifications, changes and adaptations, and the same are intended to be comprehended within the meaning and range of equivalents of the appended claims. The presently disclosed embodiments are considered in all respects to be illustrative, and not restrictive. The scope of the invention is indicated by the appended claims, rather than the foregoing description, and all changes that come within the meaning and range of equivalence thereof are intended to be embraced therein.

Having described the invention, we claim the following:

1. A method for determining an optimal classifier model for a pattern recognition system, comprising:
    selecting a plurality of initial classifier models from a set of available classifier models;
    producing an optimal representative classifier for each classifier model according to an iterative optimization routine, the iterative optimization routine comprising iterative repetition of the following steps until the occurrence of a termination event:
    determining an architecture for each selected classifier model according to an optimization algorithm;
    optimizing at least one numerical parameter within the determined architecture; and
    determining a set of optimum features for the determined architecture; and
    accepting the representative classifier having a best associated value for a fitness function.

2. A method as set forth in claim 1, wherein the step of selecting a set of features includes the use of principle component analysis.

3. A method as set forth in claim 1, wherein the architecture is determined according to a genetic optimization algorithm.

4. A method as set forth in claim 1, wherein the classifier model is automatically updated to recognize additional classes, further comprising the following steps:
    grouping a plurality of rejected pattern samples into clusters according to the similarities between the pattern samples;
    searching at least one database to identify at least one of the clusters of rejected pattern samples;
    submitting at least one cluster not identified in the database search to an expert verifier for identification if one or more clusters are not identified in the database search; and
    adding the pattern samples from the identified clusters to a set of training samples.

5. A method as set forth in claim 1, wherein the method further comprises the step of determining a set of output classes via a clustering algorithm and associating each of a plurality of training samples with an output class.

6. A computer program product comprising a computer readable medium encoded with computer executable instructions, operative in a data processing system, for determining an optimal classifier model for a pattern recognition system, comprising:
    a system control program that selects a plurality of classifier models from a set of available classifier models; and
    an iterative loop that produces an optimal representative classifier for each classifier model according to an iterative optimization routine, the iterative loop comprising:
    an architecture determination portion that determines an architecture for each selected classifier model according to an optimization algorithm;
    a parameter optimizer that optimizes at least one parameter within the determined architecture; and
    a feature optimizer that selects an optimal set of features for the determined architecture;
    wherein the system control program accepts the representative classifier having a best associated value for a fitness function upon termination of the iterative optimization routine.

7. A method for determining an optimal classifier model for a pattern recognition system, comprising:
    selecting a plurality of initial classifier models from a set of available classifier models;
    producing an optimal representative classifier for each classifier model according to an iterative optimization routine;
    accepting the representative classifier having a best associated value for a fitness function; and
    updating the accepted classifier to recognize additional classes, wherein updating the accepted classifier comprises:
    grouping a plurality of rejected pattern samples into clusters according to the similarities between the pattern samples;
    searching at least one database to identify at least one of the clusters of rejected pattern samples;
    submitting at least one cluster not identified in the database search to an expert verifier for identification if one or more clusters are not identified in the database search; and
    adding the pattern samples from the identified clusters to a set of training samples.

8. A method as set forth in claim 7, wherein the step of producing an optimal representative of a classifier model includes iteratively repeating the following steps until the occurrence of a termination event:
    classifier model includes iteratively repeating the following steps until the occurrence of a termination event:
    determining an architecture for each selected classifier model according to an optimization algorithm;
    optimizing at least one numerical parameter within the determined architecture; and
    determining a set of optimum features for the determined architecture.

9. A method as set forth in claim 8, wherein the step of selecting a set of features includes the use of principle component analysis.

10. A method as set forth in claim 8, wherein the architecture is determined according to a genetic optimization algorithm.

11. A method as set forth in claim 7, wherein the method further comprises the step of determining a set of output classes via a clustering algorithm and associating each of a plurality of training samples with an output class.

* * * * *